United States Patent [19]

Hamilton

[11] Patent Number: 5,527,506

[45] Date of Patent: Jun. 18, 1996

[54] METHOD FOR ENHANCEMENT OF POLYGUANIDE BASED SANITIZING SYSTEM

[76] Inventor: Jock Hamilton, 3741 E. Telegraph Rd., Piru, Calif. 93040

[21] Appl. No.: 511,843

[22] Filed: Aug. 7, 1995

Related U.S. Application Data

[63] Continuation of Ser. No. 225,422, Apr. 8, 1994, abandoned, which is a continuation of Ser. No. 64,483, May 19, 1993, abandoned.

[51] Int. Cl.⁶ ..................................................... C23F 11/18
[52] U.S. Cl. ..................... 422/18; 252/187.1; 424/78.09; 504/122; 504/123; 504/151
[58] Field of Search ........................ 422/18; 252/187.1; 424/78.09; 71/67

[56] References Cited

U.S. PATENT DOCUMENTS

| | | | |
|---|---|---|---|
| 4,014,676 | 3/1977 | Carter et al. | 71/67 |
| 4,388,229 | 6/1983 | Fu | 252/549 |

OTHER PUBLICATIONS

BioLab, BAQUACIL TECHNICAL INFORMATION, Jun. 28, 1990, 4 pages.
ICI Americas Inc., Baquacil Brochure, 1990, 2 pages BAC 2–70 –0084–390.
ICI Americas Inc., BAQUACIL Merchandising Guide, Apr. 1990, 9 pages.
ICI Americas Inc., BAQUACIL Authorized Dealer Program, 31 pages.
ICI Americas Inc., BAQUACIL Pool Care Guide, BAC 3 Dec. 1986, 18 pgs.
ICI Americas Inc., BAQUACIL Pool Care Guide, BAC 3–70, –0084–391 1990, 27 pgs.

*Primary Examiner*—Timothy M. McMahon
*Attorney, Agent, or Firm*—R. Joseph Trojan

[57] ABSTRACT

The invention discloses a composition and method for the enhancement of polyguanide based water sanitizing systems and for conversion of such systems to alternative water sanitizing systems if desired. The method includes the addition of an enhancing or conversion agent selected from the group consisting of a halogen salt, a Bromohydantoin and a chlorobromohydantoin in an amount to provide a concentration of approximately from 1 to 50 parts per million. Sodium borate and/or polyphosphate may also be added to the system to improve the effectiveness of the enhancing agent. The system may be converted to an alternative water sanitizing system by the addition of a sanitizing agent selected from the group consisting of chlorine, copper, silver, quaternary ammonium compounds, and polyquaternary ammonium compounds, which may be released into the water at a rate of 0.01 to 1 ounces per hour per 10,000 gallons of water for a period until conversion is complete.

21 Claims, No Drawings

METHOD FOR ENHANCEMENT OF POLYGUANIDE BASED SANITIZING SYSTEM

This application is a continuation of applicant's application Ser. No. 08/225,422, filed Apr. 8, 1994, now abandoned, which was a continuation of application Ser. No. 08/064,483, filed May 19, 1993, now abandoned.

BACKGROUND OF THE INVENTION

1. Field of the Invention

This invention relates to a method for the enhancement of a polymeric biguanide based water sanitizing system and to the conversion of such a system to a halogen based or alternative based water sanitizing system.

2. Background of the Invention

There are many methods available for the control of the growth of bacteria and algae in aqueous systems such as pools and spas. Traditionally, halogen based systems have been used as sanitizers that have included the use of chlorine in doses of 1 to 10 parts per million. But another popular sanitizing system that has been widely adopted is based upon the use of polymeric biguanide as described in U.S. Pat. No. 4,014,676. Such polymeric guanide-type systems have been popular because they do not cause eye irritation that is common with chlorine based systems and because polymeric guanide-based systems have been thought to be less expensive because it has been believed that smaller quantities of chemicals are required when compared with chlorine based systems. Baquacil® sold by ICI Americas, Inc. is the primary polymeric biguanide-based product in the market today. A similar polymeric product is Softswim® manufactured by Biolab, Inc. and another polymeric sanitizer is sold under the tradename Sustain® by PPG, Inc. located at 1 PPG Place, Pittsburgh, Pa. 15272.

Unfortunately, it has been observed that algae are able to become resistant to the sanitizing effects of polymeric guanide-based systems. When this occurs, polymeric biguanide based pools are typically treated with products that contain hydrogen peroxide as their active ingredient. For example, Baquashock™ is one such product containing a solution of 28% hydrogen peroxide, which has a very short activity in a swimming pool. These products are not always effective, and the unsightly algae continues to grow unchecked. In addition to various algae, it has been reported that persistent blooms of bacteria having a reddish-pink appearance and water molds have developed in polymeric biguanide based pools. In many cases, treatment with products such as Baquashock™ have no effect on these problems as well.

In addition, linear quaternary algicides have been employed in attempts to bring algae containing Baquacil pools under control, but such algicide have only experienced limited success. Other approaches have included shock treatment with chlorine or potassium monopersulfate, but such shock treatments have resulted in plugged filters, stained pool walls, and pool water having a muddy appearance.

The same problems have been observed with respect to other polymeric systems such as polymeric quaternary ammonium based sanitizing systems. Because of these problems associated with polymeric biguanide and polymeric quaternary pools, it is frequently desired to return the pool to a chlorine based sanitizing system to eliminate the microbial life forms that have taken over the pool. Unfortunately, the prior art teaches that polymeric guanide-based systems are incompatible with halogen systems. When bromine or chlorine is added directly to a body of water using a polymeric biguanide-based system, the halogen reacts rapidly with the biguanides to produce organic precipitates that give the pool an aesthetically unpleasant appearance. For this reason, the prior art teaches that the pool must be drained and refiled with fresh water if one desires to convert to a halogen based system from a polymeric biguanide-based system. Obviously, the prior art approach is time consuming, costly, and environmentally undesirable.

DETAILED DESCRIPTION OF THE INVENTION

To overcome the prior art problems with polymeric biguanide systems, the present inventor has developed a method for restoring and enhancing the effectiveness of a biguanide system that has lost its ability to control the growth of algae and other microbes. The invention also provides a method for the conversion of a polymeric biguanide system to a chlorine based system without draining the pool and without causing the ugly precipitation of the biguanide. It has been discovered that the addition of trace amounts of sodium bromide to a biguanide system will quickly kill off persistent algae, bacteria and other water molds restoring the pool to a sanitized condition. This is a completely unexpected result because, unlike bromine, sodium bromide by itself has no antimicrobial activity of any kind. Microbes can flourish in a sodium bromide environment.

But when trace levels of sodium bromide are added to a biguanide system, a synergistic anti-microbial effect is achieved. This result cannot be accounted for from the sodium bromide alone because the trace levels of sodium bromide introduced into the pool could not generate sufficient quantities of bromine to account for the result obtained. Therefore, the sodium bromide appears to interact with the polymeric biguanide to reactivate the effectiveness of the polymeric biguanide system. However, the mechanism is not known at this time. The sodium bromide will be referred to for convenience as the enhancing agent or the conversion agent. The terms can be used interchangeably.

This is a particularly surprising result because the prior art teaches that the addition of bromide to a biguanide system will result in the aesthetically undesirable precipitation of the biguanide. In fact, the manufacturers of Baquacil® warn against the addition of bromine containing compounds to a Baquacil® treated pool (i.e., polymeric biguanide treated pool). Yet, the predicted precipitation does not occur with trace amounts of sodium bromide. This new and novel method can save a biguanide pool that has gone bad thereby eliminating the necessity of draining the entire pool. The pool owner may be satisfied with the restoration of the effectiveness of his or her biguanide sanitizing system and may continue with this system. But the owner may also wish to discontinue use of the polymeric biguanide system and convert to a halogen based sanitizing system.

The trace quantities of sodium bromide referred to are in the approximate range of 1 to 50 parts per million, which is the preferred range. This corresponds to the addition of approximately between 1.33 ounces to 67 ounces of sodium bromide per 10,000 gallons of pool water once per week or continuously in tablet form. In peak weather conditions during summer, the concentrations at the higher end of the range are recommended. In practice, the inventor adds the indicated quantities of sodium bromide in a diluted solution that corresponds to the addition of 1.5 to 12 ounces of sodium bromide solution per 10,000 gallons of pool water per week. It is possible for the upper range to be as high as 5000 parts per million sodium bromide, which is the equivalent of 416 pounds of sodium bromide per 10,000 gallon pool.. However, this higher range is not applicable if the enhancing agent is bromohydantoin or chlorobromohydantoin, which are discussed below.

To switch to a halogen based system, trace amounts of chlorine can be gently fed into the pool after the sodium bromide has re-activated the effectiveness of the biguanide system. In the preferred embodiment, chlorine is released at a rate ranging approximately from 0.01 to 6 parts per million per hour per 10,000 gallons of pool water until conversion is complete. The preferred rate of release is adjusted to maintain approximately 0.3 parts per million in 10,000 gallons of pool water. A slower rate of release can be employed, however it is unnecessary because it only delays the complete conversion to halogen based sanitizing system and because there generally is no danger that the polymeric biguanide will react adversely (e.g., precipitate) with the chlorine at rates of release as high as 6 part per million per hour. The release rate can be as high as 500 parts per million per hour, but is not preferred.

However, the rate of addition of chlorine should be adjusted based upon the levels of Baquacil or other polymeric biguanide in the pool. At higher levels of biguanide above 75 ppm, a slower rate of release is preferred. If the levels of biguanide have dropped, a higher rate of release is acceptable. The objective is to create a trace level of chlorine in the pool without pumping too much chlorine into the pool at one time that might create a localized concentration of chlorine high enough to cause precipitation of the biguanide in the pool.

The period of treatment can also be varied to achieve the desired trace levels of chlorine. For instance, if the rate of release of chlorine is raised, then the time period that the pool pump is turned on may be shortened and the same trace levels of chlorine will be maintained. The trace levels are maintained until the polymeric biguanide has dropped to zero in the pool. Unfortunately, the test kits that are currently on the market for polymeric biguanide, sometimes indicate that no polymeric biguanide is present when in fact there may still be substantial levels remaining in the pool. Therefore, one may want to make addition confirmatory measurements over a few days before raising chlorine levels to those employed with chlorine sanitizing systems.

The addition of chlorine can be accomplished by any conventional method that provides for the controlled release of chemical agents. The most effective and practical method employed by the inventor provides for insertion of a baggy of chlorine in the pool skimmer or in the feeder preferably upstream of the filtering system. Adding the baggy to a floater is not advised because this can result in higher localized concentrations of chlorine in the pool that can result in precipitation of the polymeric biguanide.

When the baggy method is employed, it should contain approximately 200 grams of chlorine and should be made of plastic of sufficient thickness to resist tearing. Slight perforations are made in the baggy to provide for the desired rate of release of chlorine within the range stated above. In practice, one or two corners of the baggy are cut off to achieve the desired effect. This is the preferred method of practicing the invention, but any method that provides for the timed release of chlorine can be used.

The description above has involved the method of practicing the invention using sodium bromide as the initial conversion or enhancing agent and chlorine as final sanitizing agent to which the pool is converted. However, it should be made clear that any bromine salt, including but not limited to alkali metal salts of bromine and alkali earth metal salts of bromine, can be employed as the conversion or enhancing agent in place of sodium bromide in equivalent molar concentrations. Bromohydantoins and chlorobromohydantoins also have been used with success as the conversion or enhancing agent in the same trace amounts. In addition, other halogen salts of iodine and florine also can be used in the same manner.

The conversion or enhancing agent may be made more effective by the addition of salts of sodium borate either alone or in combination with polyphosphates. The sodium borate may be added in quantities of 0.05 to 100 parts per million and the polyphosphate may be added in quantities of 0.05 to 100 parts per million. As stated, these ingredients may be added in these concentration ranges either alone or in combination.

The description above has been limited to the conversion of a polymeric biguanide and polymeric quaternary sanitizing systems to a chlorine based sanitizing system. However, the method described can also serve to convert a biguanide sanitizing system to sanitizing systems other than chlorine based systems. For example, this new method can be used to convert the pool to other well known sanitizing systems such as those based upon other bromine, copper, or silver. The method can also be used to convert a biguanide system to one based upon quaternary ammonium compounds, polyquaternary ammonium compounds or other polymeric algicide systems and vice versa. Other sanitizing agents used in the pool industry include peroxygen compounds, including potassium monopersulfate, perborate, persulfate, and mixtures thereof. An example of an effective peroxygen compound mixture is a product called H48 sold by La Porte Industries. All of the above sanitizing agents can be used in the concentration range of approximately 0.05 to 100 parts per million.

For instance, by the gradual introduction of the copper at the same rate employed for the introduction of chlorine above, one is able to convert the biguanide pool to a copper based sanitizing system. The same rates of introduction apply to the active agent in each of the alternative sanitizing systems listed above. The method can also be used to convert a biguanide system to one based upon quaternary ammonium compounds, or polyquaternary ammonium compounds.

The invention is illustrated but not limited by the following examples:

EXAMPLE I

An outdoor swimming pool having a 15,000 gallon capacity is the subject of the first example. The owner of this swimming pool employed a Baquacil sanitizing system for controlling microbial growth. The Baquacil system worked well until a yellow algae began growing on the walls of the pool. In accordance with the Baquacil manufacturer's instructions, Baquashock was feed into the pool. Even after several treatments with Baquashock, the yellow algae remained on the walls of the pool. Following the failed Baquashock treatments, the present inventor added 7.5 ounces of sodium bromide to the 15,000 gallon pool. It was discovered the next day that the algae had disappeared overnight.

EXAMPLE II

This example involved a vinyl, outdoor swimming pool whose owner used a Baquacil sanitizing system. The pool developed a severe case of green algae that contaminated both the pool water and lined the walls of the pool. In response to the problem, the pool was treated with a double dose of Baquacil and was shock treated with Baquashock in accordance with the manufacturer's directions. In spite of this intense treatment, virtually no change in the algae content of the pool was observed. Following this regiment, the pool was treated with a sodium bromide solution at 5 ounces per 10,000 gallons pool water in which the solution contained 0.7 ounces of sodium bromide per 1.0 ounces of solution. Within 24 hours, the pool water was clear of green algae. Within 36 hours, the algae had disappeared from the walls of the pool as well.

EXAMPLE III

A 15,000 gallon swimming pool that had 45 ppm Baquacil was converted to a chlorine-based sanitizing system by the addition of 32 ounces of solution which contained 5 ounces of sodium bromide. One chlorine tab was placed in a feeder and set to provide 0.2 ppm chlorine feeding ahead of the filter. On a weekly basis an approximately 8.0 ounce solution of sodium bromide was added at approximately 0.5 ounces of sodium bromide per ounce. Baquacil was slowly deposited into the filter and in approximately four weeks all of the Baquacil was gone according to the test kit provided by the manufacturer. The Pool improved significantly in clarity and water polish to a level that was substantially better than the conditions prior to treatment with no evidence of algae, staining or turbid water.

EXAMPLE IV

An 18,000 gallon swimming pool that had been using Baquacil was treated with approximately 10 ounces of sodium bromide. The Baquacil was initially measured at 30 ppm. and was removed in approximately three weeks with 3" chlorine tabs being placed in a zip lock bag with the corners cut out and placed in the skimmer. On a weekly basis, a solution of sodium bromide polyphosphate and sodium borate blend was added at a rate of 10 ounces of solution containing 0.7 ounces of sodium bromide. The pool became progressively clearer over the three week treatment period with no signs of algae and a chlorine level was maintained at only 0.2 ppm for the treatment period, then continued for six weeks after Baquacil® was zero ppm.

EXAMPLE V

A pool that had Baquacil and mustard algae was converted to a chloro-bromo system by the addition of 10 ounces of sodium bromide per 10,000 gallons of water. Chlorine was added by placing two 3" tabs in a zip lock bag with two of the corners cut out. Sodium bromide and borax was added at a rate of 60% sodium bromide to 40% borax ratio and 8 ounce per 10,000 gallons of pool water. The Baquacil level in the pool was determined to be 50 ppm by the dealer and 40 ppm by the home owner, which reflected discrepancies in testing. Two months later the Baquacil level was at 20 ppm with 0.2 ppm chlorine maintained. The pool showed greatly improved clarity, no algae on the second day of treatment to final conversion. The home owner reported longer filter cycles than on straight baquacil and increased bather comfort. The pool continued to show decreased levels of baquacil, but was closed for the winter before all of the baquacil was depleted.

EXAMPLE VI

An 18,000 gallon swimming pool that had been using Baquacil was treated with approximately 12 ounces of sodium bromide. The Baquacil was initially measured at 40 ppm and was removed in approximately eight weeks with potassium monopersulfate added to the skimmer at a rate of 0.5 pounds per day. On a weekly basis, a solution of sodium bromide polyphosphate and sodium borate blend was added at a rate of 10 ounces of solution containing 0.7 ounces of sodium bromide. The pool became progressively clearer over the eight week treatment period with no signs of algae and a chlorine level was maintained at only 0.1 ppm for the treatment period.

The invention and its attendant advantages will be understood from the foregoing description and it will be apparent that various changes and substitutions may be made without departing from the spirit of the invention.

I claim:

1. A method for controlling the microbial content of swimming pools and spas that have been treated with polymeric biguanides in concentrations of approximately 30 to 75 ppm, which comprises the addition of an enhancing agent selected from the group consisting of sodium bromide, a bromohydantoin and a chlorobromohydantoin in an amount to provide a concentration of approximately from 1 to 50 parts per million.

2. A method for controlling the microbial content of a body of water that has been treated with polymeric biguanides in concentrations of approximately 30 to 75 ppm, which comprises the addition of sodium bromide in an amount to provide a concentration of approximately from 1 to 50 parts per million.

3. The method described in claim 2 wherein salt of sodium borate is added to the system in an amount to provide a concentration of approximately from 0.05 to 100 parts per million.

4. The method described in claim 2 wherein polyphosphate is added to the system in an amount to provide a concentration of approximately from 0.05 to 100 parts per million.

5. A method for the conversion of a body of water that has been treated with polymeric biguanides in concentrations of approximately 30 to 75 ppm, to an alternative water sanitizing agent, which comprises:

a. the addition of sodium bromide in an amount to provide a concentration of approximately from 1 to 5000 parts per million; and b. following the addition of said sodium bromide, the addition of a sanitizing agent selected from the group consisting of chlorine, copper, silver, quaternary ammonium compounds, and polyquaternary ammonium compounds is released into the water at a concentration of 0.05 to 100 parts per million until conversion is complete.

6. The method described in claim 5 wherein salt of sodium borate is added to the system in an amount to provide a concentration of approximately from 0.05 to 100 parts per million.

7. The method described in claim 5 wherein polyphosphate is added to the system in an amount to provide a concentration of approximately from 0.05 to 100 parts per million.

8. A method for the conversion of a body of water that has been treated with polymeric biguanides in concentrations of approximately 30 to 75 ppm, to an alternative water sanitizing system, which comprises:

a. the addition of sodium bromide in an amount to provide a concentration of approximately from 1 to 5000 parts per million; and b. following the addition of said sodium bromide, the addition of an oxidizing sanitizing agent selected from the group consisting of chlorine, bromine, potassium monopersulfate, perborate, and peroxygen compounds is released into the water at a concentration of 0.05 to 100 parts per million until conversion is complete.

9. The method described in claim 8 wherein salt of sodium borate is added to the system in an amount to provide a concentration of approximately from 0.05 to 100 parts per million.

10. The method described in claim 8 wherein polyphosphate is added to the system in an amount to provide a concentration of approximately from 0.05 to 100 parts per million.

11. A method for enhancing the control of the microbial content of a body Of water that has been treated with polymeric biguanides in concentrations of approximately 30 to 75 ppm, which comprises the addition of a bromide salt, in an amount to provide a concentration of approximately from 1 to 5000 parts per million.

12. The method described in claim 11 wherein salt of sodium borate is added to the system in an amount to provide a concentration of approximately from 0.05 to 100 parts per million.

13. The method described in claim 11 wherein polyphosphate is added to the system in an amount to provide a concentration of approximately from 0.05 to 100 parts per million.

14. A method for improving the antimicrobial effectiveness of polymeric biguanides that have been added to a body of water in concentrations of approximately 30 to 0.75 ppm, which comprises the addition of an enhancing agent selected from the group consisting of a bromine salt, a bromohydantoin and a chlorobromohydantoin in an amount to provide a concentration of approximately from 1 to 50 parts per million.

15. The method described in claim 14 wherein salt of boron is added to the system in an amount to provide a concentration of approximately from 0.05 to 100 parts per million.

16. The method described in claim 14 wherein polyphosphate is added to the system in an amount to provide a concentration of approximately from 0.05 to 100 parts per million.

17. A method for the conversion of a body of water that has been treated with polymeric biguanides in concentrations of approximately 30 to 75 ppm, to an alternative water sanitizing system, which comprises:

a. the addition of a conversion agent selected from the group consisting of a bromine salt, a bromohydantoin and a chlorobromohydantoin in an amount to provide a concentration of approximately from 1 to 50 parts per million; and b. following the addition of said conversion agent, the addition of an oxidizing sanitizing agent selected from the group consisting of chlorine, bromine, potassium monopersulfate, perborate, and peroxygen compounds is released into the water at a concentration of 0.05 to 100 parts per million until conversion is complete.

18. The method described in claim 17 wherein salt of boron is added to the system in an amount to provide a concentration of approximately from 0.05 to 100 parts per million.

19. A method for the conversion of a body of water that has been treated with polymeric biguanides in concentrations of approximately 30 to 75 ppm, to an alternative water sanitizing system, which comprises:

a. the addition of a conversion agent selected from the group consisting of a bromine salt, a bromohydantoin and a chlorobromohydantoin in an amount to provide a concentration of approximately from 1 to 50 parts per million; and b. following the addition of said conversion agent, the addition of a sanitizing agent selected from the group consisting of chlorine, copper, silver, quaternary ammonium compounds, and polyquaternary ammonium compounds is released into the water at a concentration of 0.05 to 100 parts per million until conversion is complete.

20. The method described in claim 19 wherein salt of boron is added to the system in an amount to provide a concentration of approximately from 0.05 to 100 parts per million.

21. The method described in claim 19 wherein polyphosphate is added to the system in an amount to provide a concentration of approximately from 0.05 to 100 parts per million.

* * * * *